US008095990B2

(12) United States Patent
Tanimura

(10) Patent No.: US 8,095,990 B2
(45) Date of Patent: Jan. 10, 2012

(54) GAMING MACHINE, GAMING INFORMATION AUTHENTICATION LOADING DEVICE AND GAMING INFORMATION LOADING DEVICE

(75) Inventor: Tatsuhiko Tanimura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1181 days.

(21) Appl. No.: 11/406,404

(22) Filed: Apr. 19, 2006

(65) Prior Publication Data

US 2006/0240888 A1 Oct. 26, 2006

(30) Foreign Application Priority Data

Apr. 25, 2005 (JP) .................................. 2005-126990
Apr. 25, 2005 (JP) .................................. 2005-126999

(51) Int. Cl.
*G06F 7/04* (2006.01)
*G06F 17/30* (2006.01)
*A63F 9/24* (2006.01)
*G06F 17/00* (2006.01)

(52) U.S. Cl. .......... 726/30; 713/165; 713/169; 713/176; 713/192; 713/193; 713/194; 380/251; 463/20; 463/29

(58) Field of Classification Search .................. 380/251; 713/165, 169, 176, 192, 193, 194; 726/30; 463/20, 29
See application file for complete search history.

(56) References Cited

U.S. PATENT DOCUMENTS

| 6,149,522 A | 11/2000 | Alcorn et al. |
| 6,722,986 B1 * | 4/2004 | Lyons et al. .................... 463/29 |
| 7,188,255 B1 * | 3/2007 | Toh et al. ...................... 713/191 |
| 7,454,169 B2 * | 11/2008 | Soerensen et al. ............ 455/26.1 |
| 2003/0037239 A1 * | 2/2003 | Leung et al. .................. 713/169 |
| 2003/0045351 A1 | 3/2003 | Gauselmann |
| 2003/0216172 A1 | 11/2003 | LeMay et al. |

FOREIGN PATENT DOCUMENTS

| JP | 08-241194 | 9/1996 |
| JP | 2001-344096 | 12/2001 |
| JP | 2002-341957 | 11/2002 |
| WO | WO 99/65579 | 12/1999 |

* cited by examiner

*Primary Examiner* — Michael Simitoski
(74) *Attorney, Agent, or Firm* — Oliff & Berridge, PLC

(57) ABSTRACT

A gaming machine comprises a gaming board and a mother board. The gaming board comprises a boot ROM and a card slot. The boot ROM stores therein an authentication program for authenticating a gaming program and a gaming system program stored in a memory card. The card slot receives the memory card therein. The mother board comprises a main CPU and a RAM. The main CPU reads the authentication program from the boot ROM and the gaming program and gaming system program from the memory card received in the card slot. The main CPU executes an authentication process for the read gaming program and gaming system program according to the read authentication program. The main CPU writes the authenticated gaming program and gaming system program to the RAM. The main CPU controls a game proceeding according to the written gaming program and gaming system program.

10 Claims, 13 Drawing Sheets

GAMING MACHINE, GAMING INFORMATION AUTHENTICATION LOADING DEVICE AND GAMING INFORMATION LOADING DEVICE

CROSS REFERENCE TO RELATED APPLICATION

This application claims benefit of priority under 35 U.S.C. §119 to Japanese Patent Application No. 2005-126990, filed on Apr. 25, 2005, and Japanese Patent Application No. 2005-126999, filed on Apr. 25, 2005, the entire contents of which are incorporated by reference herein.

BACKGROUND OF THE INVENTION

1. Field of the Invention

The present invention relates to a gaming machine and a gaming information authentication loading device configured to authenticate and load gaming information stored in a portable storage medium, and a gaming information loading device configured to load the gaming information stored in the portable storage medium.

2. Description of the Related Art

There have been conventionally various gaming machines such as a video gaming machine, a slot machine, a pachi-slot machine and a pachinko gaming machine. Recently, a portable storage medium such as a compact flash memory card (a registered trade name of "CF card") is employed to feed a gaming program and gaming information into each of these gaming machines. The gaming program is used to control a gaming procedure, a gaming image display, a gaming action and the like to be executed in the gaming machine. The gaming information is used in a game to be played in the gaming machine.

In a case where the portable storage medium is employed in the gaming machine, the portable storage medium stores the gaming information therein and then is attached to the gaming machine to feed the gaming information into the gaming machine. In this configuration, a malicious third party can carry out a fraud act such as making a copy or a falsification of the stored gaming information because the portable storage medium is not incorporated into the gaming machine and is easily detached from the gaming machine. Therefore, it is very important to prevent the malicious third party from carrying out the fraud act when the gaming information is fed into the gaming machine by means of the portable storage medium.

Conventional prevention methods for the fraud act are disclosed in Japanese Patent Laid-open Publications No. 2001-344096, No. 2002-341957 and No. H08-241194.

In the first reference, when a storage medium is attached to a gaming machine, the gaming machine stores unique identification information for the gaming machine in the storage medium, and the storage medium stores unique identification information for the storage medium in the gaming machine. If the unique identification information for the gaming machine matches the unique identification information for the storage medium, software stored in the storage medium is executed.

In the second reference, when a removal unit is attached to a computer main body, a user code stored in the removal unit is compared with a unit code stored in the computer main body. If the user code matches the unit code, the computer main body boots up a system.

In the third reference, a security code stored in a storage means (storage medium) is compared with a security code stored in a gaming machine. If both security codes match each other, the gaming machine reads a gaming program stored in the storage means. This security check is repeatedly conducted during a gaming procedure.

However, these prevention methods for the fraud act have the problem that the stored gaming information is not authenticated. More specifically, none of these prevention methods certifies that a falsification of the stored gaming information is not made.

The prevention method disclosed in the first reference can prevent a malicious third party from making a copy of the stored gaming information and using it on the gaming machine by means of another storage medium, however, can not prevent the malicious third party from making a falsification of the stored gaming information. The prevention method disclosed in the second reference can authenticate the removal unit, however can not prevent a malicious third party from making a falsification of the stored gaming information because data stored in the removal unit are not authenticated. The prevention method disclosed in the third reference can prevent a malicious third party from replacing the gaming program stored in one storage medium by a fraudulent gaming program stored in another storage medium and using it on the gaming machine after the security check is started, however, can not prevent the malicious third party from making a falsification of the gaming program stored in the one storage medium.

SUMMARY OF THE INVENTION

It is an object of the present invention to provide a gaming machine and a gaming information authentication loading device capable of authenticating and loading gaming information stored in a storage medium, and a gaming information loading device capable of loading the gaming information stored in the storage medium.

In order to achieve the object, the present invention provides a gaming machine comprising: a game action executing device configured to execute a game action; a loading device comprising: a program storage unit configured to store therein an authentication program for authenticating gaming information stored in a storage medium; and a connection unit configured to be connected to the storage medium, and a process device comprising: a readable and rewritable storage unit; a reading unit configured to read the authentication program from the program storage unit and the gaming information from the storage medium connected to the connection unit; an authentication unit configured to execute an authentication process for the read gaming information according to the read authentication program; a writing unit configured to write the gaming information authenticated by the authentication unit to the readable and rewritable storage unit; and an action controlling unit configured to control the game action executing device according to the written gaming information so that the game action executing device executes the game action.

According to the present invention, in the gaming machine, the loading device is connected to the process device, which can easily load and store the gaming information stored in the storage medium to the readable and rewritable storage unit by only connecting the storage medium to the connection unit of the loading device. Further, the program storage unit of the loading device stores therein the authentication program for authenticating the gaming information, which can load the gaming information that is not falsified by a malicious third party to the readable and rewritable storage unit by executing the authentication process for the gaming information according to the authentication program.

In order to achieve the object, the present invention provides a gaming machine comprising: a game action executing device configured to execute a game action; a loading device comprising: a connection unit configured to be connected to a storage medium, and a process device comprising: a readable and rewritable storage unit; a program storage unit configured to store therein an authentication program for authenticating gaming information stored in the storage medium; a reading unit configured to read the authentication program from the program storage unit and the gaming information from the storage medium connected to the connection unit; an authentication unit configured to execute an authentication process for the read gaming information according to the read authentication program; a writing unit configured to write the gaming information authenticated by the authentication unit to the readable and rewritable storage unit; and an action controlling unit configured to control the game action executing device according to the written gaming information so that the game action executing device executes the game action.

According to the present invention, in the gaming machine, the loading device is connected to the process device, which can easily load and store the gaming information stored in the storage medium to the readable and rewritable storage unit by only connecting the storage medium to the connection unit of the loading device. Further, the program storage unit of the process device stores therein the authentication program for authenticating the gaming information, which can load the gaming information that is not falsified by a malicious third party to the readable and rewritable storage unit by executing the authentication process for the gaming information according to the authentication program. Furthermore, the authentication program is stored in the program storage unit of the process device, which can omit a loading process for loading the authentication program to the process device side.

In order to achieve the object, the present invention provides a gaming information authentication loading device comprising: a loading device comprising: a connection unit configured to be connected to a storage medium storing gaming information therein; and a program storage unit configured to store therein an authentication program for authenticating the gaming information, and a process device comprising: a readable and rewritable storage unit; a reading unit configured to read the authentication program from the program storage unit and the gaming information from the storage medium connected to the connection unit; an authentication unit configured to execute an authentication process for the read gaming information according to the read authentication program; and a writing unit configured to write the gaming information authenticated by the authentication unit to the readable and rewritable storage unit.

According to the present invention, in the gaming information authentication loading device, the loading device is connected to the process device, which can easily load and store the gaming information stored in the storage medium to the readable and rewritable storage unit by only connecting the storage medium to the connection unit of the loading device. Further, the program storage unit of the loading device stores therein the authentication program for authenticating the gaming information, which can load the gaming information that is not falsified by a malicious third party to the readable and rewritable storage unit by executing the authentication process for the gaming information according to the authentication program.

In order to achieve the object, the present invention provides a gaming information authentication loading device comprising: a loading device comprising: a connection unit configured to be connected to a storage medium storing gaming information therein, and a process device comprising: a readable and rewritable storage unit; a program storage unit configured to store therein an authentication program for authenticating the gaming information; a reading unit configured to read the authentication program from the program storage unit and the gaming information from the storage medium connected to the connection unit; an authentication unit configured to execute an authentication process for the read gaming information according to the read authentication program; and a writing unit configured to write the gaming information authenticated by the authentication unit to the readable and rewritable storage unit.

According to the present invention, in the gaming information authentication loading device, the loading device is connected to the process device, which can easily load and store the gaming information stored in the storage medium to the readable and rewritable storage unit by only connecting the storage medium to the connection unit of the loading device. Further, the program storage unit of the process device stores therein the authentication program for authenticating the gaming information, which can load the gaming information that is not falsified by a malicious third party to the readable and rewritable storage unit by executing the authentication process for the gaming information according to the authentication program. Furthermore, the authentication program is stored in the program storage unit of the process device, which can omit a loading process for loading the authentication program to the process device side.

In order to achieve the object, the present invention provides a gaming information loading device configured to load gaming information stored in a storage medium from the storage medium to a mother board connected to the gaming information loading device, comprising: a connection unit configured to be connected to the storage medium; and a program storage unit confiuged to store therein an authentication program for authenticating the gaming information.

According to the present invention, the gaming information loading device is capable of being connected to the mother board, which realize to read the gaming information from the storage medium connected to the connection unit and then authenticate and load the read gaming information in the mother board side.

In order to achieve the object, the present invention provides a gaming machine comprising: a game action executing device configured to execute a game action; a loading device including a connection unit configured to be connected to a storage medium; and a process device including a readable and rewritable storage unit, wherein each of a program storage unit, a reading unit, an authentication unit and a mutual authentication unit is included in at least one of the loading device and the process device: the program storage unit configured to store therein an authentication program for authenticating gaming information stored in the storage medium; the reading unit configured to read the authentication program from the program storage unit and the gaming information from the storage medium connected to the connection unit; the authentication unit configured to execute an authentication process for the read gaming information according to the read authentication program; and the mutual authentication unit configured to execute a mutual authentication process for the authentication program according to the gaming information authenticated by the authentication unit, the process device includes a writing unit configured to write the gaming information authenticated by the authentication unit to the readable and rewritable storage unit, and the process device includes an action controlling unit configured to control the game action executing device according to the written gaming information so that the game action executing device executes the game action, when the mutual authentication unit has executed the mutual authentication process.

According to the present invention, in the gaming machine, the loading device is connected to the process device, which can easily load and store the gaming information stored in the storage medium to the readable and rewritable storage unit by only connecting the storage medium to the connection unit of the loading device. Further, the program storage unit stores therein the authentication program for authenticating the gaming information, which can load the gaming information that is not falsified by a malicious third party to the readable and rewritable storage unit by executing the authentication process for the gaming information according to the authentication program. Furthermore, the gaming information and the authentication program can maintain consistency each other by executing the mutual authentication process for the authentication program according to the authenticated gaming information.

In order to achieve the object, the present invention provides a gaming information authentication loading device comprising: a loading device including therein a connection unit configured to be connected to a storage medium storing gaming information therein; and a process device including a readable and rewritable storage unit, wherein each of a program storage unit, a reading unit, an authentication unit and a mutual authentication unit is included in at least one of the loading device and the process device: the program storage unit configured to store therein an authentication program for authenticating the gaming information; the reading unit configured to read the authentication program from the program storage unit and the gaming information from the storage medium connected to the connection unit; the authentication unit configured to execute an authentication process for the read gaming information according to the read authentication program; and the mutual authentication unit configured to execute a mutual authentication process for the authentication program according to the gaming information authenticated by the authentication unit, and the process device includes a writing unit configured to write the gaming information authenticated by the authentication unit to the readable and rewritable storage unit.

According to the present invention, in the gaming information authentication loading device, the loading device is connected to the process device, which can easily load and store the gaming information stored in the storage medium to the readable and rewritable storage unit by only connecting the storage medium to the connection unit of the loading device. Further, the program storage unit stores therein the authentication program for authenticating the gaming information, which can load the gaming information that is not falsified by a malicious third party to the readable and rewritable storage unit by executing the authentication process for the gaming information according to the authentication program. Furthermore, the gaming information and the authentication program can maintain consistency each other by executing the mutual authentication process for the authentication program according to the authenticated gaming information.

In order to achieve the object, the present invention provides a gaming information loading device configured to load gaming information stored in a storage medium from the storage medium to a mother board connected to the gaming information loading device, comprising: a connection unit configured to be connected to the storage medium; a program storage unit confiuged to store therein an authentication program for authenticating the gaming information; a reading unit configured to read the authentication program from the program storage unit and the gaming information from the storage medium connected to the connection unit; and an authentication unit configured to execute an authentication process for the read gaming information according to the read authentication program.

According to the present invention, the gaming information loading device is capable of being connected to the mother board, which realize to read the gaming information from the storage medium connected to the connection unit and the authentication program from the program storage unit. Further, the mother board can authenticate and load the read gaming information according to the read authentication program.

DESCRIPTION OF THE PREFERRED EMBODIMENTS

Figure 1:
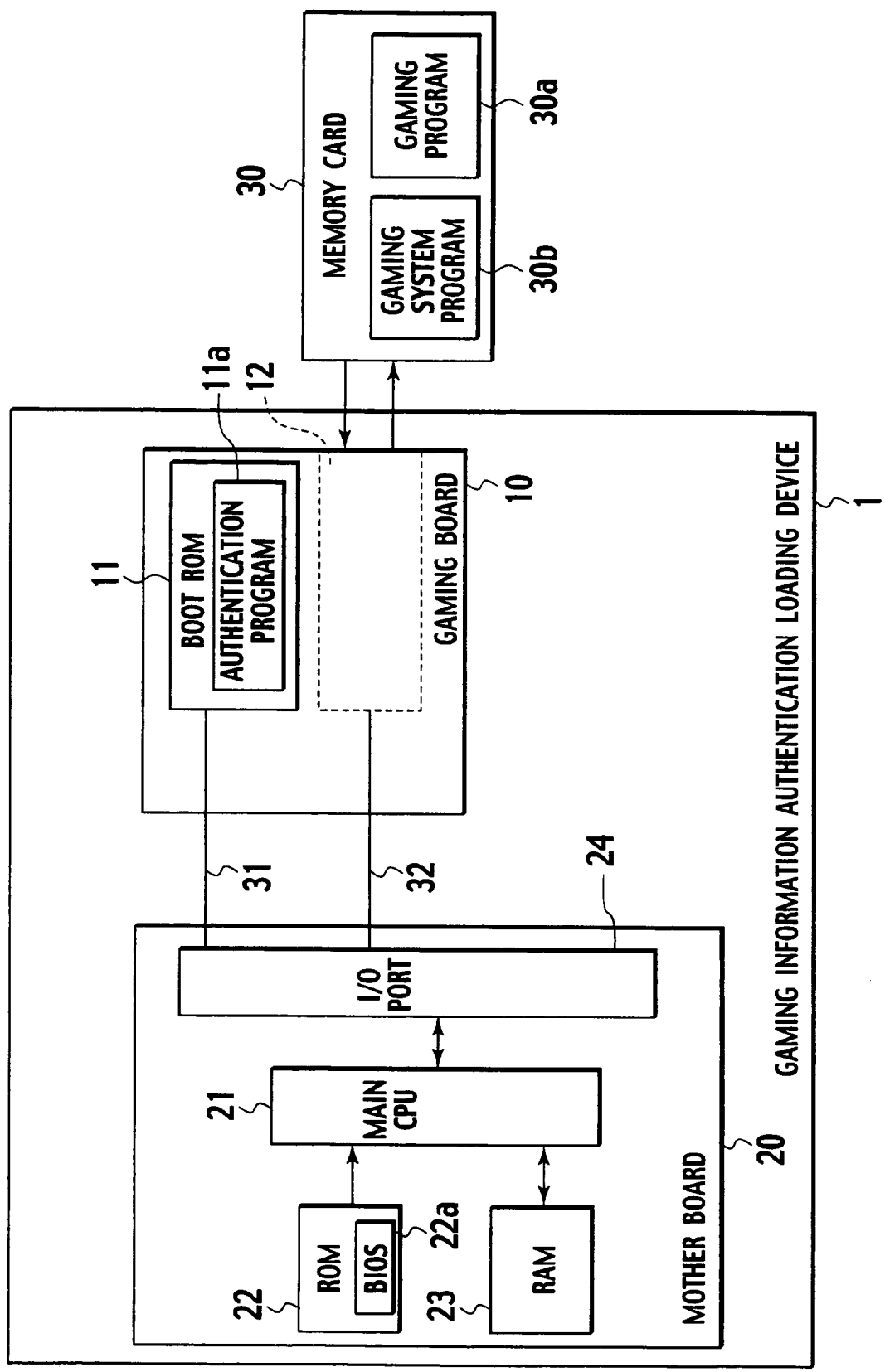
FIG. 1 is a block diagram of a geming information authentication loading device according to a first exemplary embodiment of the present invention.

Hereinafter, first to third exemplary embodiments of the present invention will be described with reference to FIGS. 1 to 13.

First Exemplary Embodiment (Configuration of Gaming Information Authentication Loading Device)

The gaming information authentication loading device 1 comprises a gaming board 10, a mother board 20, a PCI (Peripheral Component Interconnect) bus 31 and an IDE (Integrated Device Electronics) bus 32. The gaming board 10 is employed as a gaming information loading device or a loading device in the present invention. The mother board 20 is employed as a process device in the present invention. The mother board 20 is connected to the gaming board 10 via the PCI bus 31 and the IDE bus 32. The PCI bus 31 and the IDE bus 32 are employed as a signaling portion in the present invention.

A memory card 30 stores a gaming program 30a and a gaming system program 30b therein. The memory card 30 is employed as a portable storage medium such as a CF card in the present invention. The gaming program 30a and the gaming system program 30b are employed as gaming information such as a slot game program in the present invention. The gaming information authentication loading device 1 carries out a gaming information authentication loading procedure for authenticating and then loading the gaming program 30a and the gaming system program 30b.

The gaming board 10 comprises a boot ROM 11 and a card slot 12 for the memory card 30. The gaming board 10 loads the gaming program 30a and the gaming system program 30b from the memory card 30 and then transfers the loaded programs to the mother board 20.

The boot ROM 11 is connected to the mother board 20 via the PCI bus 31. The boot ROM 11 stores therein an authentication program (falsification check program) 11a and a boot code program (not shown) for allowing a main CPU 21 of the mother board 20 to boot the authentication program 11a via the PCI bus 31. The boot ROM 11 functions as a program storage means in the present invention. The authentication program 11a is a program for authenticating the gaming program 30a and the gaming system program 30b to be transferred to a slot machine 41 by means of the memory card 30. In the authentication program 11a, an authentication procedure for checking that the gaming program 30a and the gaming system program 30b are not falsified is written.

The card slot 12 is connected to the mother board 20 via the IDE bus 32. The card slot 12 functions as a connection means (physical connection portion) capable of receiving the memory card 30 therein in the present invention. The memory card 30 is received in the card slot 12 in a readable situation for the gaming program 30a and the gaming system program 30b.

The mother board 20 is composed of a commercial general mother board (print circuit board on which basic parts of a personal computer are mounted). The mother board 20 comprises the main CPU (Central Processing Unit) 21, a ROM (Read Only Memory) 22, a RAM (Random Access Memory) 23 and I/O port 24. The PCI bus 31 and the IDE bus 32 are connected to the I/O port 24. In the mother board 20, the main CPU 21 executes a BIOS (Basic Input/Output System) 22a stored in the ROM 22 to initialize peripheral devices including the gaming board 10 when a power source unit 39 (see FIG. 3) connected to the mother board 20 is powered on. Then, the main CPU 21 reads the gaming program 30a and the gaming system program 30b stored in the memory card 30 via the gaming board 10 to carry out the authentication loading process. It is noted that the main CPU 21 is run to supply an electric power to the gaming board 10 via the PCI bus 31 when the electric power is supplied from the power source unit 39 into the mother board 20.

The ROM 22 stores therein permanent programs such as the BIOS 22a to be executed by the main CPU 21 and permanent data. A memory device such as a flash memory is employed as the ROM 22. It is noted that the memory device may use a rewritable or non-rewritable memory. The RAM 23 is employed as a readable and rewritable storage means in the present invention. The RAM 23 stores therein temporal programs and/or temporal data employed by the main CPU 21. The authentication program 11a, the gaming program 30a and the gaming system program 30b are temporally stored in the RAM 23.

(Configuration of Slot Machine)

The slot machine 41 is employed as a gaming machine in the present invention. The gaming information authentication loading device 1 is incorporated into the slot machine 41. The slot machine 41 executes the slot game program on the basis of the gaming program 30a and the gaming system program 30b loaded into the gaming information authentication loading device 1.

Figure 2:
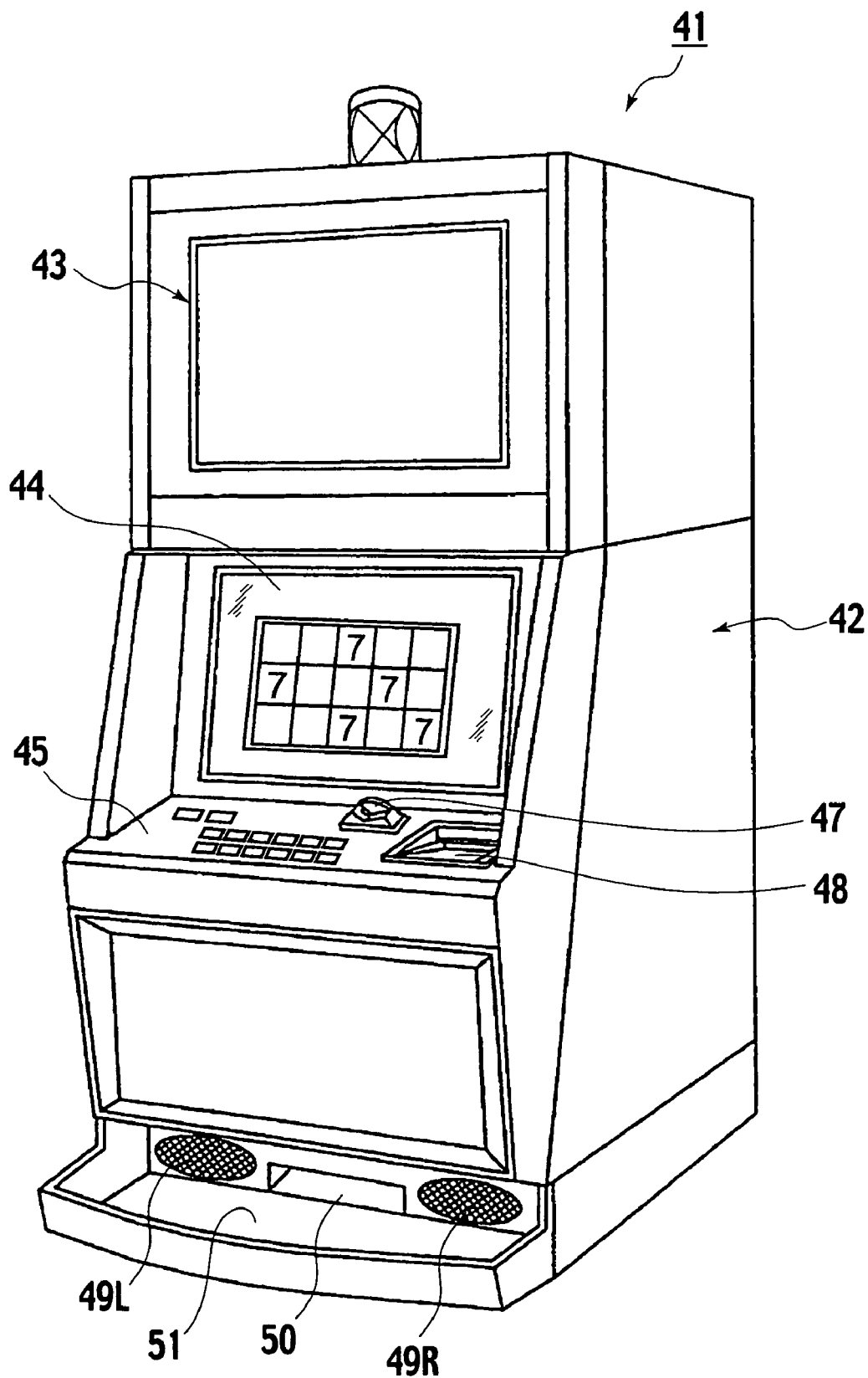
FIG. 2 is a perspective view of a slot machine according to the first exemplary embodiment of the present invention.

As shown in FIG. 2, the slot machine 41 comprises a cabinet 42, an upper image display panel 43, a lower image display panel 44, a control panel 45, a coin insertion slot 47, a bill insertion slot 48, speakers 49L, 49R, a payout slot 50 and a coin receiving portion 51.

The cabinet 42 forms the entirety of the slot machine 41. The upper image display panel 43 is mounted on a front upper portion of the cabinet 42. The upper image display panel 43 includes therein a liquid crystal display device configured to display an image (e.g. an explanation image for the slot game) which does not directly relate to a game image such as a video reel image. The displayed image is changed according to contents of action.

The lower image display panel 44 is mounted on a front center portion of the cabinet 42. The lower image display panel 44 includes therein a liquid crystal display device which is employed as a display means in the present invention. The liquid crystal display device displays the game image. More specifically, the liquid crystal display device variably displays the video reel image formed by five quasi-reels on which a plurality of symbols is mounted. The slot machine 41 determines a dividend according to a symbol combination displayed on the liquid crystal display device at a time of stopping the five quasi-reels.

The control panel 45 is mounted on the front center portion of the cabinet 42 and below the lower image display panel 44. A plurality of operation buttons is arranged on the control panel 45. A player uses the operation buttons to operate a predetermined operation. The coin insertion slot 47 is mounted on the control panel 45. A player uses the coin insertion slot 47 to insert one or more gaming media such as coins or medals into the slot machine 41. The bill insertion slot 48 is mounted on the control panel 45. A player uses the bill insertion slot 48 to insert one or more bills into the slot machine 41.

The speakers 49L, 49R are mounted on the front lower portion of the cabinet 42. The payout slot 50 is mounted on the front lower portion of the cabinet 42 and between the speakers 49L, 49R. The coin receiving portion 51 forward extends from the front lower portion of the cabinet 42.

Figure 3:
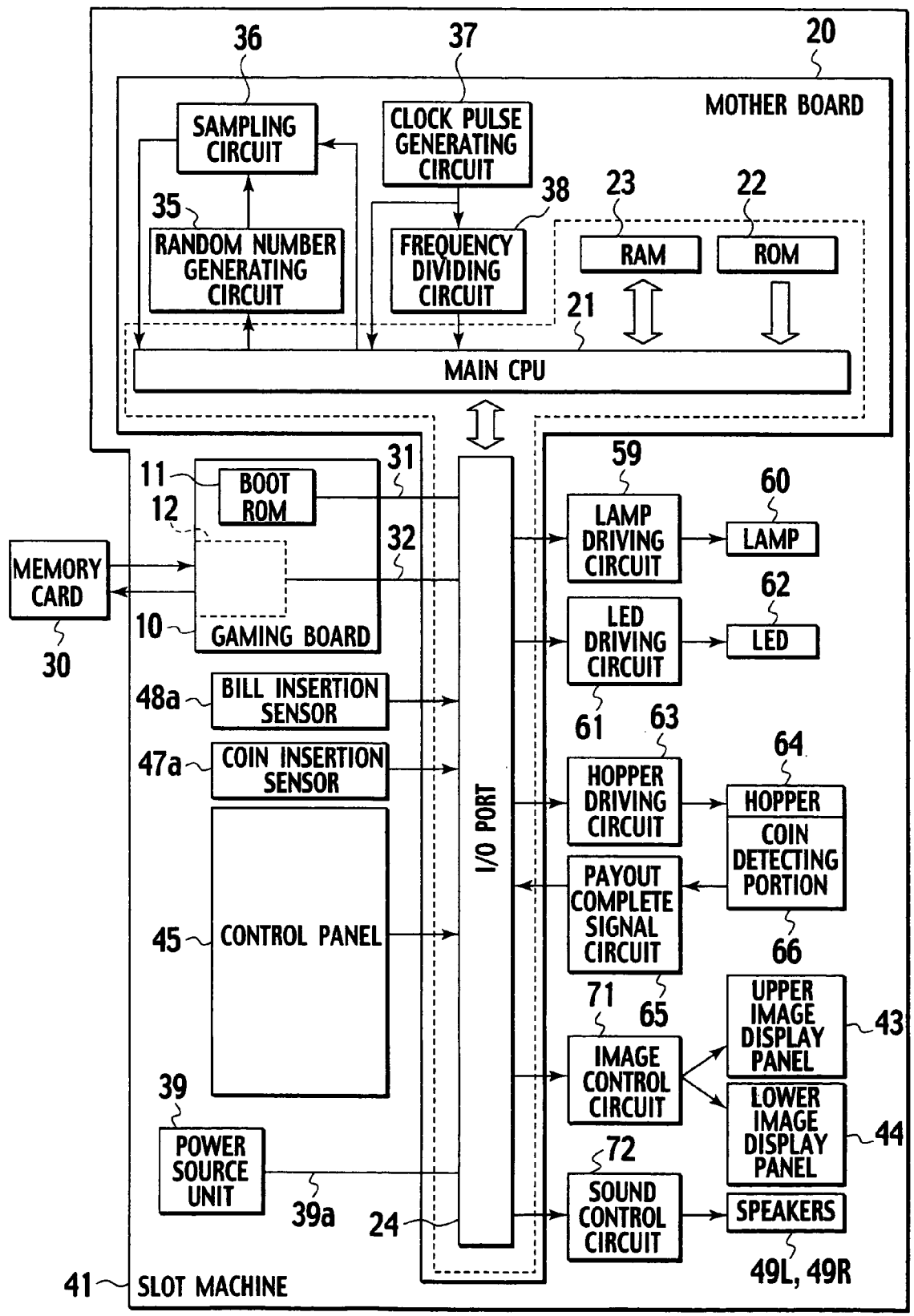
FIG. 3 is a block diagram of the slot machine according to the first exemplary embodiment of the present invention.

As shown in FIG. 3, the slot machine 41 further comprises the gaming board 10, the mother board 20, the power source unit 39, a power source cable 39a, a coin insertion sensor 47a, a bill insertion sensor 48a, a lamp driving circuit 59, a lamp 60, an LED driving circuit 61, an LED 62, a hopper driving circuit 63, a hopper 64, a payout complete signal circuit 65, a coin detecting portion 66, an image control circuit 71 and a sound control circuit 72. The lamp driving circuit 59, the lamp 60, the LED driving circuit 61, the LED 62, the hopper driving circuit 63, the hopper 64, the payout complete signal circuit 65, the coin detecting portion 66, the image control circuit 71 and the sound control circuit 72 operate as a game action executing device in the present invention.

The moter borad 20 comprises the main CPU 21, the ROM 22, the RAM 23, the I/O port 24, a random number generating circuit 35, a sampling circuit 36, a clock pulse generating circuit 37 and a frequency dividing circuit 38. The random number generating circuit 35 generates random numbers within a constant range according to an order of the main CPU 21. The sampling circuit 36 samples one random number among the generated random numbers and then inputs the sampled random number into the main CPU 21 according to an order of the main CPU 21. The clock pulse generating circuit 37 generates a reference pulse to be employed at a time of operating the main CPU 21. The frequency dividing circuit 38 inputs into the main CPU 21 a signal which is generated by dividing the reference pulse by a constant frequency.

The power source unit 39 is connected to the mother borad 20 via the power source cable 39a. The lamp driving circuit 59 outputs into the lamp 60 a signal for lighting the lamp 60, which causes the lamp 60 to blink during the slot game. If the lamp 60 blinks, a game effect is executed. The LED driving circuit 61 controls a blink of the LED 62. The LED 62 functions as a credit number display, an obtained number display or the like. The hopper driving circuit 63 drives the hopper 64 according to a control of the main CPU 21. The hopper 64 pays out one or more winning coins from the payout slot 50 to the coin receiving portion 51. The coin detecting portion 66 counts the number of winning coins paid out by the hopper 64 and then notifies the counted number of winning coins of the payout complete signal circuit 65. The payout complete signal circuit 65 inputs into the main CPU 21 a signal for notifying a payout complete when the counted number of winning coins attaines the predetermined number of winning coins.

The image control circuit 71 controls image displays to display various images such as the variable display image of symbols on the upper image display panel 43 and the lower image display panel 44. The sound control circuit 72 amplifies a sound signal input from a sound source IC (not shown) and then outputs the amplified sound signal into the speakers 49L, 49R. Thereby, the sound control circuit 72 outputs from the speakers 49L, 49R a sound for bringing a lot of excitement to the slot game at an appropriate time. It is noted that the image control circuit 71 and the sound control circuit 72 may be incorporated into the mother board 20 by storing an image control program and a sound control program into the ROM 22. Thereby, the main CPU 21 may execute the above processes according to the image control program and the sound control program. It is further noted that the power source unit 39 is connected to other elements in addition to the mother board 20.

(Gaming Information Authentication Loading Procedure)

Figure 4:
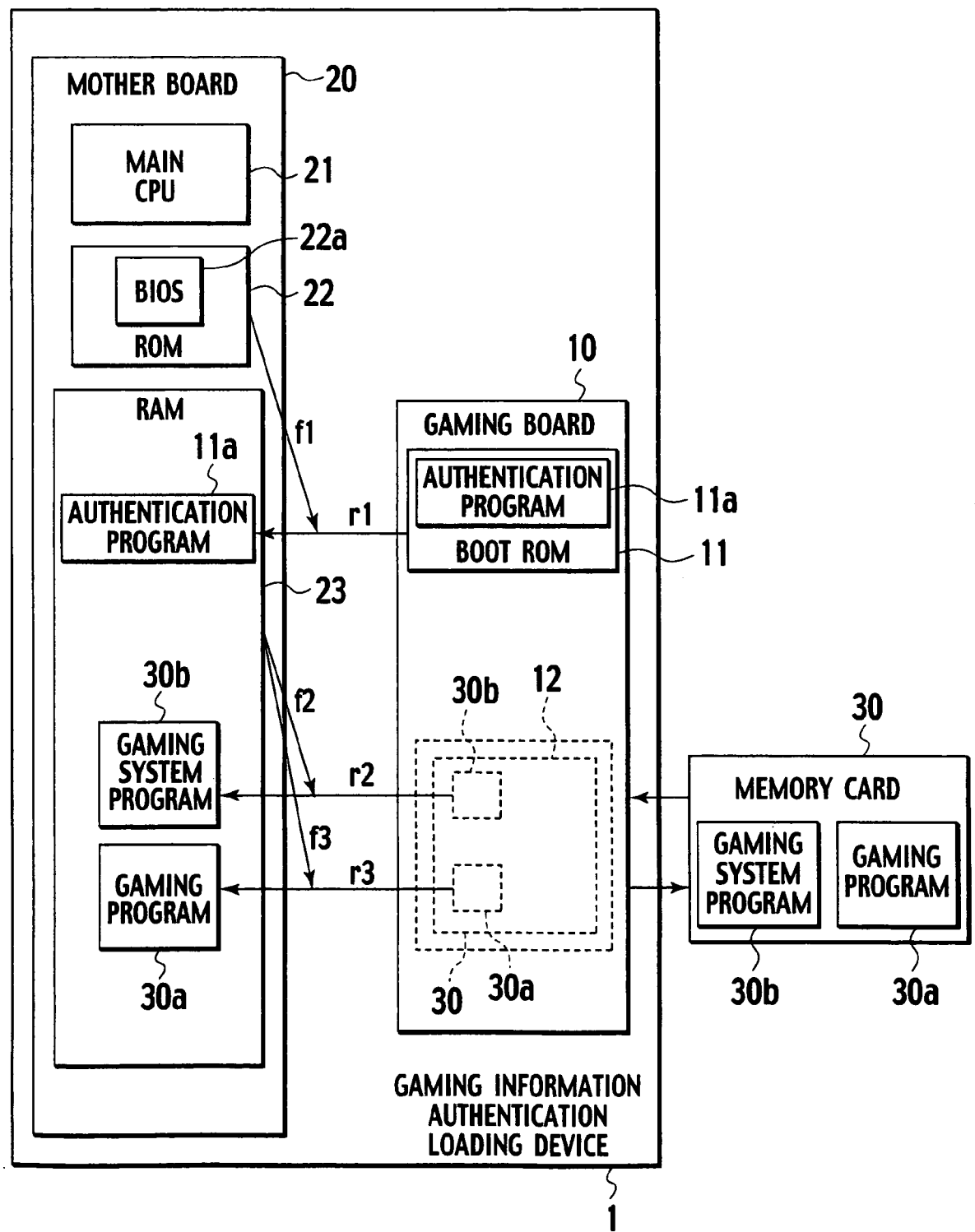
FIG. 4 is a block diagram which shows a gaming information authentication loading procedure in the gaming information authentication loading device according to the first exemplary embodiment of the present invention.
Figure 5:
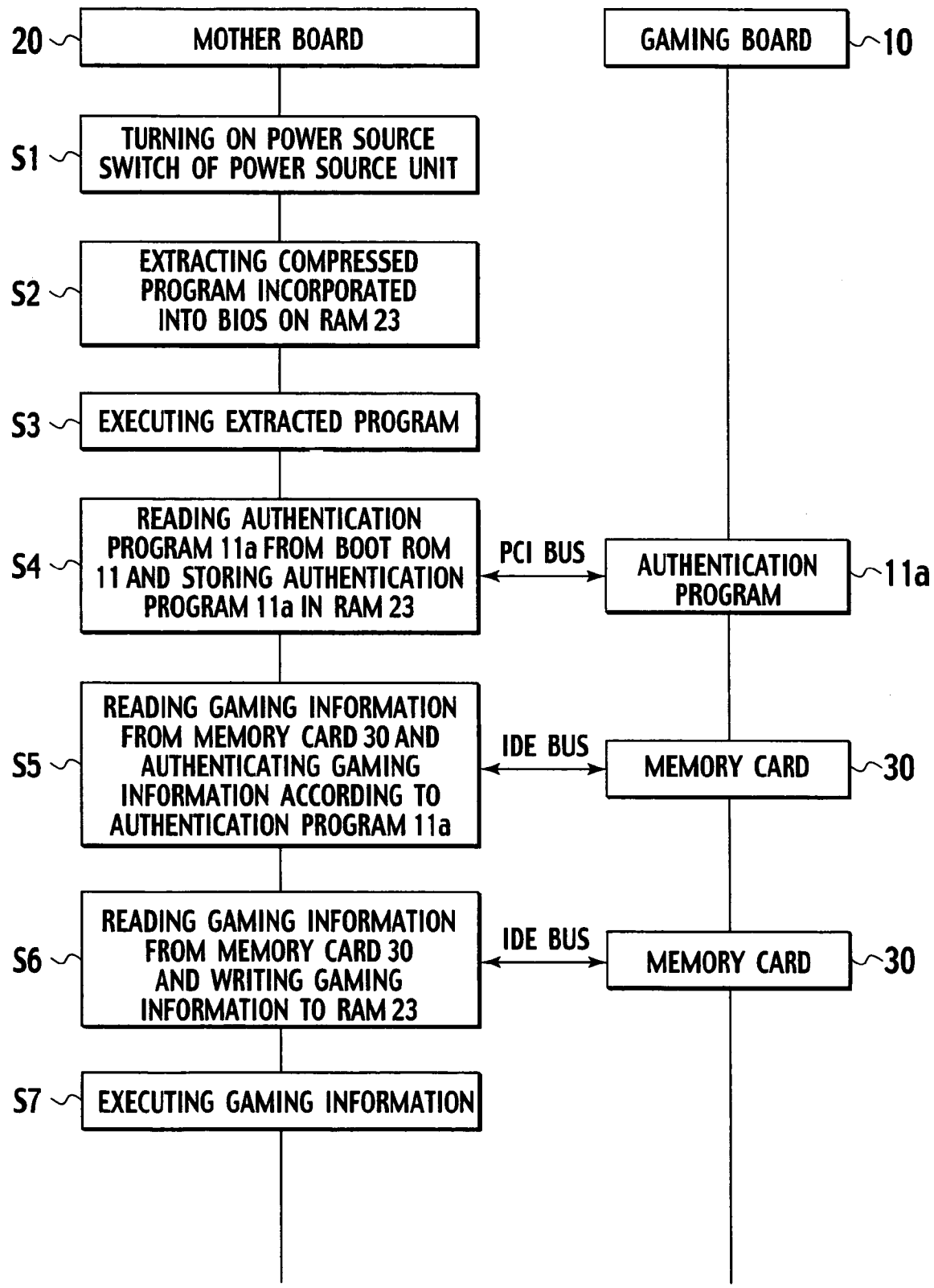
FIG. 5 is a chart which shows the gaming information authentication loading procedure executed between a mother board and a gaming board in the gaming information authentication loading device according to the first exemplary embodiment of the present invention.

A gaming information authentication loading procedure will be described with reference to FIGS. 4 and 5.

In step S1, a power source switch of the power source unit 39 connected to the mother board 20 is turned on. The memory card 30 is inserted into the card slot 12 of the gaming board 10 before or after the power source switch is turned on.

In step S2, the main CPU 21 executes the BIOS 22a to extract a compressed program incorporated into the BIOS 22a and causes the extracted program to be temporarily stored in the RAM 23. In step S3, the main CPU 21 executes the extracted program temporarily stored in the RAM 23 to check and initialize various peripheral devices. At this time, the main CPU 21 checks what peripheral device is connected to the PCI bus 31. In step S4, the main CPU 21 operates as a reading means to read the authentication program 11a stored in the boot ROM 11 because the boot ROM 11 of the gaming board 10 is connected to the PCI bus 31.

When the main CPU 21 has read the authentication program 11a, a loading process r1 for causing the read authentication program 11a to be temporarily stored in the RAM 23 is executed. In the loading process r1, the main CPU 21 causes the read authentication program 11a to be temporarily stored in the RAM 23, while carrying out a checksum in an ADDSUM type (standard check function) according to a standard BIOS function of the BIOS 22a to check whether or not the read authentication program 11a is correctly stored in the RAM 23 (see an authentication process f1 in FIG. 4).

In the step S5, the main CPU 21 checks what peripheral device is connected to the IDE bus 32 and then accesses the memory card 30 inserted into the card slot 12 via the IDE bus 32. Then, the main CPU 21 operates as the reading means to read the gaming program 30a and the gaming system program 30b from the memory card 30. At this time, the main CPU 21 reads data composed of the gaming program 30a and the gaming system program 30b every four bits. Next, the main CPU 21 operates as an authentication means to execute an authentication process f2 for the read gaming system program 30b and an authentication process f3 for the read gaming program 30a according to the stored aunthentication program 11a, in order to check that the gaming program 30a and the gaming system program 30b are not falsified and authenticate them. In step S6, the main CPU 21 operates as a writing means to execute a loading process r2 for the authenticated gaming system program 30b and a loading process r3 for the authenticated gaming program 30a to write them to the RAM 23, after the authentication processes f2, f3 normally finish.

If abnormality in each authentication process occurs, the gaming information authentication loading procedure does not normally finish. At this time, the main CPU 21 notifies the abnormality and then stops the gaming information authentication loading procedure. For example, if the gaming system program 30b is falsified, the main CPU 21 carries out an error display and then stops the gaming information authentication loading procedure. In this case, the loading processes are not executed. Therefore, the gaming program 30a and the gaming system program 30b are loaded in the mother board 20 only when they are authenticated. It is noted that the gaming information authentication loading device 1 operates in the steps S1 to S6.

In step S7, the main CPU 21 operates as an action controlling means to control a game proceeding (game action) according to the written gaming program 30a and the written gaming system program 30b. For example, the main CPU 21 controls the following operation: the image control circuit 71 displays a gaming image such as the video reel image on the lower image display panel 44; the lamp driving circuit 59 lights the lamp 60 according to the game proceeding; and the hopper driving circuit 63 operates the hopper 64 to pay out one or more coins, according to an obtained gaming winning combination. A player can play the slot game with reference to the video reel image.

The slot machine 41 carries out the gaming proceeding according to the authenticated gaming program 30a and the authenticated gaming system program 30b transferred from the memory card 30.

(Advantageous Features of Gaming Information Authentication Loading Procedure)

In the gaming information authentication loading device 1, the gaming board 10 is connected to the mother borad 20. Therefore, the gaming information such as the gaming program 30a and the gaming system program 30b can be easily loaded from the memory card 30 to the RAM 23 of the mother borad 20 when the memory card 30 storing the gaming information therein is only inserted into the card slot 12 of the gaming board 10.

The authentication program 11a described along the authentication process is stored in the boot ROM 11 of the gaming board 10. Therefore, the authentication process can be executed according to the authentication program 11a to check whether or not the gaming information is not falsified and then authenticate it when the gaming information is loaded. As a result, in the gaming information authentication loading device 1, even if the gaming information is supplied from an outside device of the slot machine 41, the authenticated gaming information that is not falsified can be loaded, which certinaly prevents a malicious third party from making a falsification for the gaming information.

The mother borad 20 is composed of a commercial general mother board. Therefore, versatility of the mother board 20 is increased to reduce a production cost.

Although the gaming program 30a and the gaming system program 30b for the slot game are loaded in the exemplary embodiment, a gaming program 30a and a gaming system program 30b for a game other than the slot game may be loaded. This realize that the slot machine 41 becomes another gaming machine such as a card gaming machine, which is capable of carrying out another game such as a card game for displaying a card image.

Second Examplary Embodiment

Figure 6:
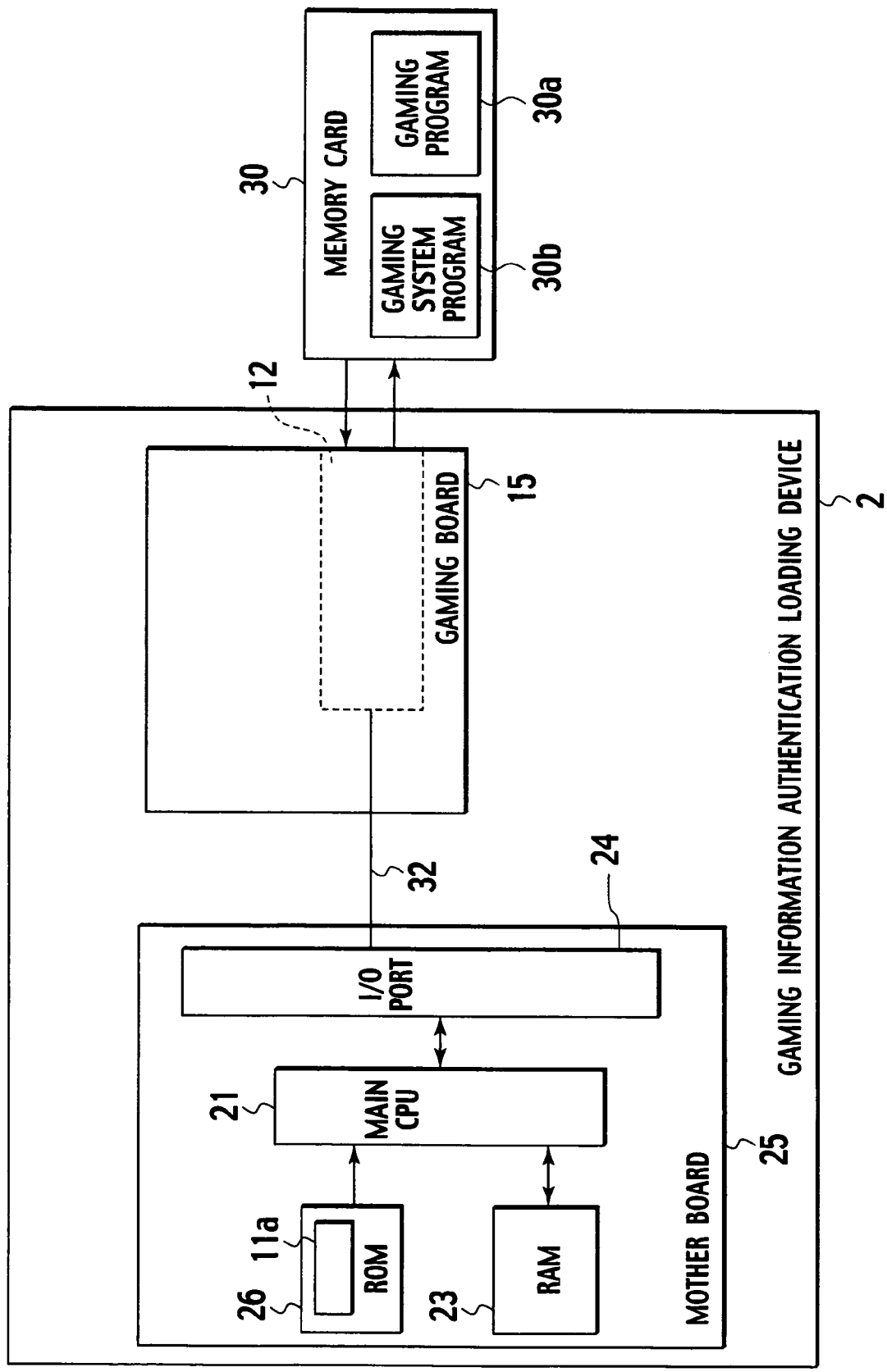
FIG. 6 is a block diagram of a geming information authentication loading device according to a second exemplary embodiment of the present invention.

As shown in FIG. 6, the gaming information authentication loading device 2 is different from the gaming information authentication loading device 1 regarding the following matters: the gaming information authentication loading device 2 has a gaming board 15 and a mother board 25 instead of the gaming board 10 and the mother board 20; and the gaming board 15 is connected to the mother board 25 only via the IDE 32.

The gaming board 15 is different from the gaming board 10 regarding the following matter: the gaming board 15 does not have the boot ROM 11. The mother board 25 is different from the mother board 20 regarding the following matter: the mother board 25 has a ROM 26 instead of the ROM 22. The ROM 26 stores the programs and the data stored in the ROM 22 and the authentication program 11a therein. It is noted that the ROM 26 may be incorporated into the main CPU 21.

The ROM 26 stores the authentication program 11a for executing the authentication procedure for the gaming program 30a and the gaming system program 30b therein. Therefore, the mother board 25 is composed of a dedicated mother board corresponding to the gaming program 30a and the gaming system program 30b.

Figure 7:
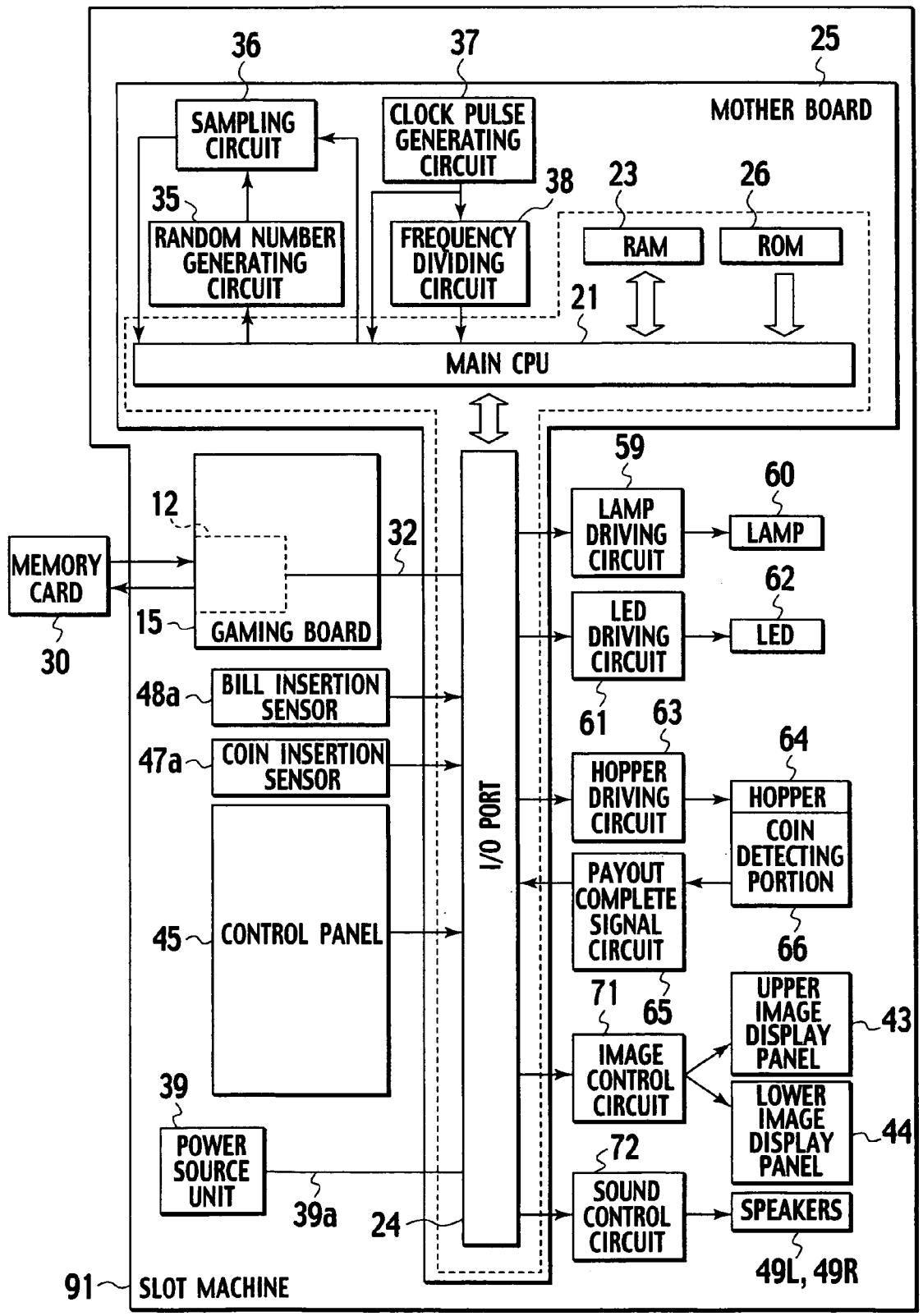
FIG. 7 is a block diagram of a slot machine according to the second exemplary embodiment of the present invention.

As shown in FIG. 7, a slot machine 91 is different from the slot machine 41 regarding the following matter: the gaming information authentication loading device 2 instead of the gaming information authentication loading device 1 is incorporated into the slot machine.

Figure 8:
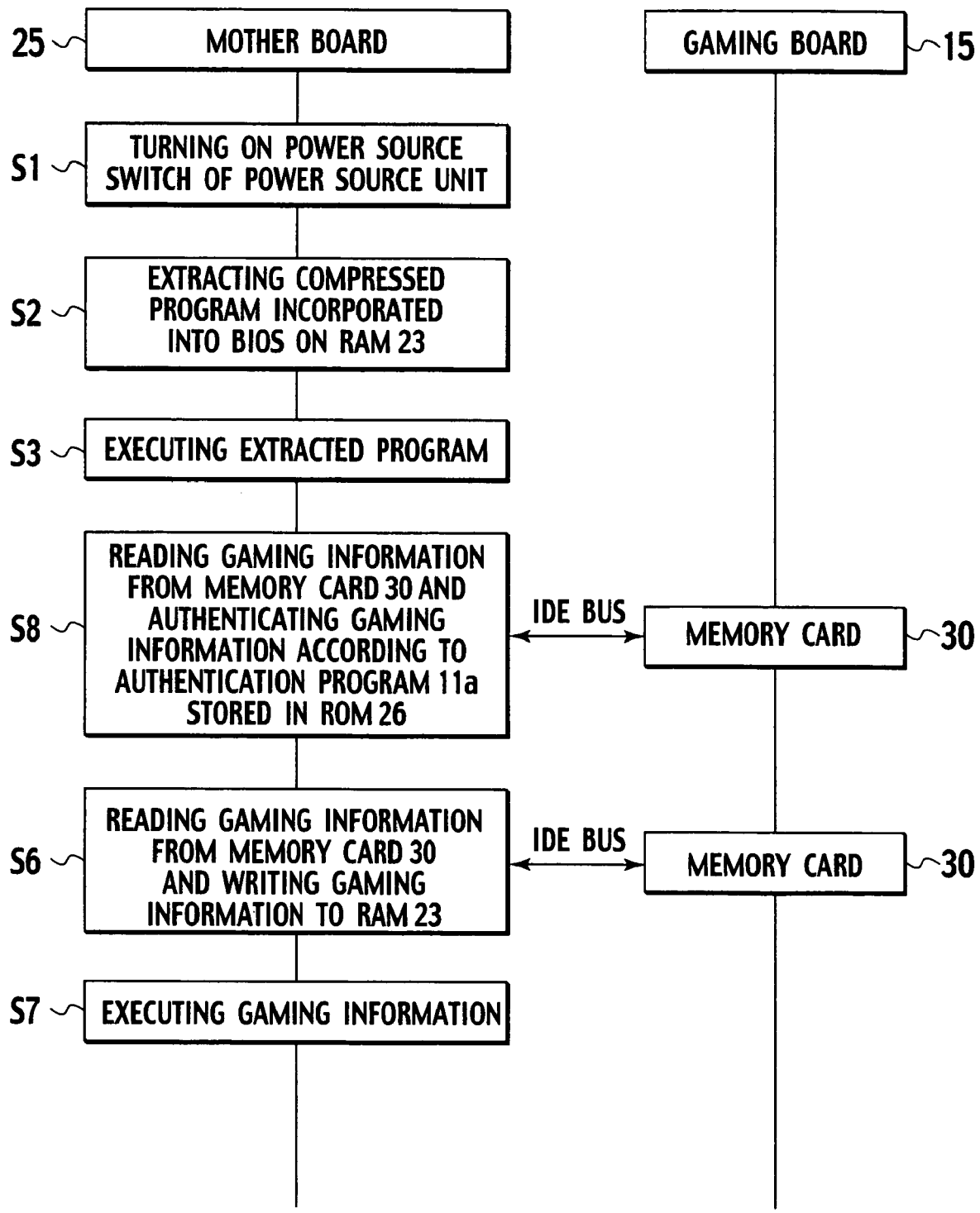
FIG. 8 is a chart which shows a gaming information authentication loading procedure executed between a mother board and a gaming board in the gaming information authentication loading device according to the second exemplary embodiment of the present invention.

As shown in FIG. 8, a gaming information authentication loading procedure is different from the gaming information authentication loading procedure of the first examplary embodiment regarding the following matter: the gaming information authentication loading device 2 executes step S8 instead of the steps S4, S5. In the gaming information authentication loading device 1, the authentication program 11a is stored in the boot ROM 11 of the gaming board 10. Thereby, the gaming information authentication loading device 1 executes the step S4 to load the authentication program 11a to the mother board 20 while carrying out the checksum. On the other hand, in the gaming information authentication loading device 2, the authentication program 11a is stored in the ROM 26 of the mother board 10. Thereby, the gaming information authentication loading device 2 does not execute to load the authentication program 11a from the gaming board 10 to the mother board 20, which allows it to execute the step S8 instead of the steps S4, S5.

In the step S8, the main CPU 21 accesses the memory card 30 inserted into the card slot 12 via the IDE bus 32. Then, the main CPU 21 operates as the reading means to read the gaming program 30a and the gaming system program 30b from the memory card 30 as well as the step S5. Next, the main CPU 21 operates as the authentication means to execute the authentication process f2 for the read gaming system program 30b and the authentication process f3 for the read gaming program 30a according to the aunthentication program 11a stored in the ROM 26, in order to check that the gaming program 30a and the gaming system program 30b are not falsified ant then authenticate them. In the step S6, the main CPU 21 operates as the writing means to execute the loading process r2 for the authenticated gaming system program 30b and the loading process r3 for the authenticated gaming program 30a to write them to the RAM 23, after the authentication processes f2, f3 normally finish. In the step S7, the main CPU 21 operates as the action controlling means to control a game proceeding (game action) according to the written gaming program 30a and the written gaming system program 30b.

Next, advantageous features of the gaming information authentication loading procedure will be described.

The gaming information such as the gaming program 30a and the gaming system program 30b can be easily loaded from the memory card 30 to the RAM 23 of the mother board 25 when the memory card 30 storing the gaming information therein is only inserted into the card slot 12 of the gaming board 15.

The authentication program 11a described along the authentication process is stored in the ROM 26 of the mother board 25. Therefore, the authentication process can be executed according to the authentication program 11a to check whether or not the gaming information is not falsified and then authenticate it when the gaming information is loaded. As a result, in the gaming information authentication loading device 2, even if the gaming information is supplied from an outside device of the slot machine 91, the authenticated gaming information that is not falsified can be loaded, which certinaly prevents a malicious third party from making a falsification for the gaming information.

The authentication program 11a is stored in the ROM 26 of the mother board 25. Therefore, loading the authentication program 11a from the gaming board 15 to the mother board 25 and carrying out the checksum can be omitted. As a result, the gaming information authentication loading procedure is easily executed in comparison with that of the first exemplary embodiment.

Third Exemplary Embodiment

Figure 9:
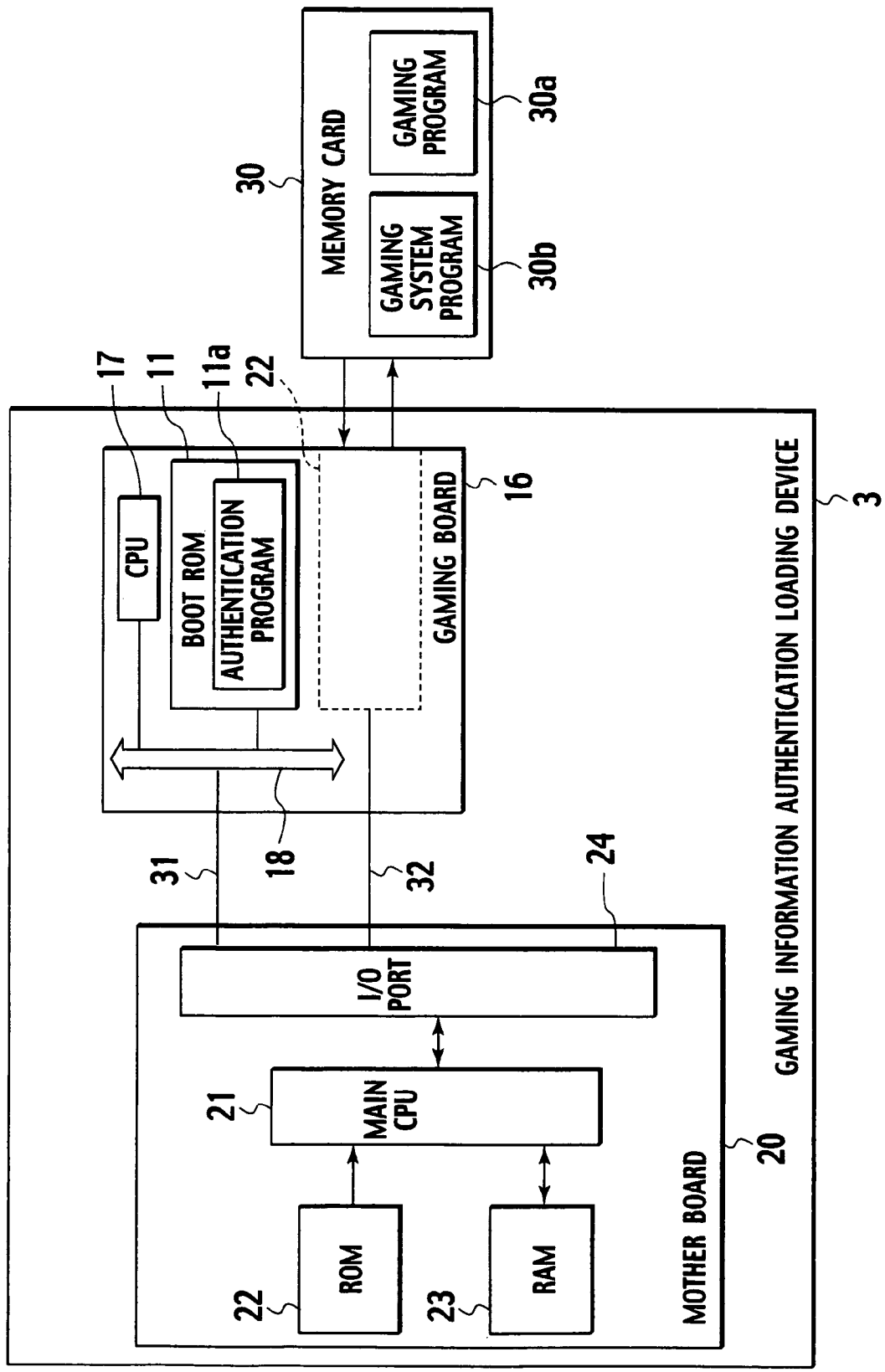
FIG. 9 is a block diagram of a geming information authentication loading device according to a third exemplary embodiment of the present invention.

As shown in FIG. 9, a gaming information authentication loading device 3 is different from the gaming information authentication loading device 1 regarding the following matter: the gaming information authentication loading device 3 has a gaming board 16 instead of the gaming board 10.

The gaming board 16 is different from the gaming board 10 regarding the following matter: the gaming board 16 has a CPU 17 and an inner bus 18. The CPU 17 is connected to the boot ROM 11 via the inner bus 18.

Figure 10:
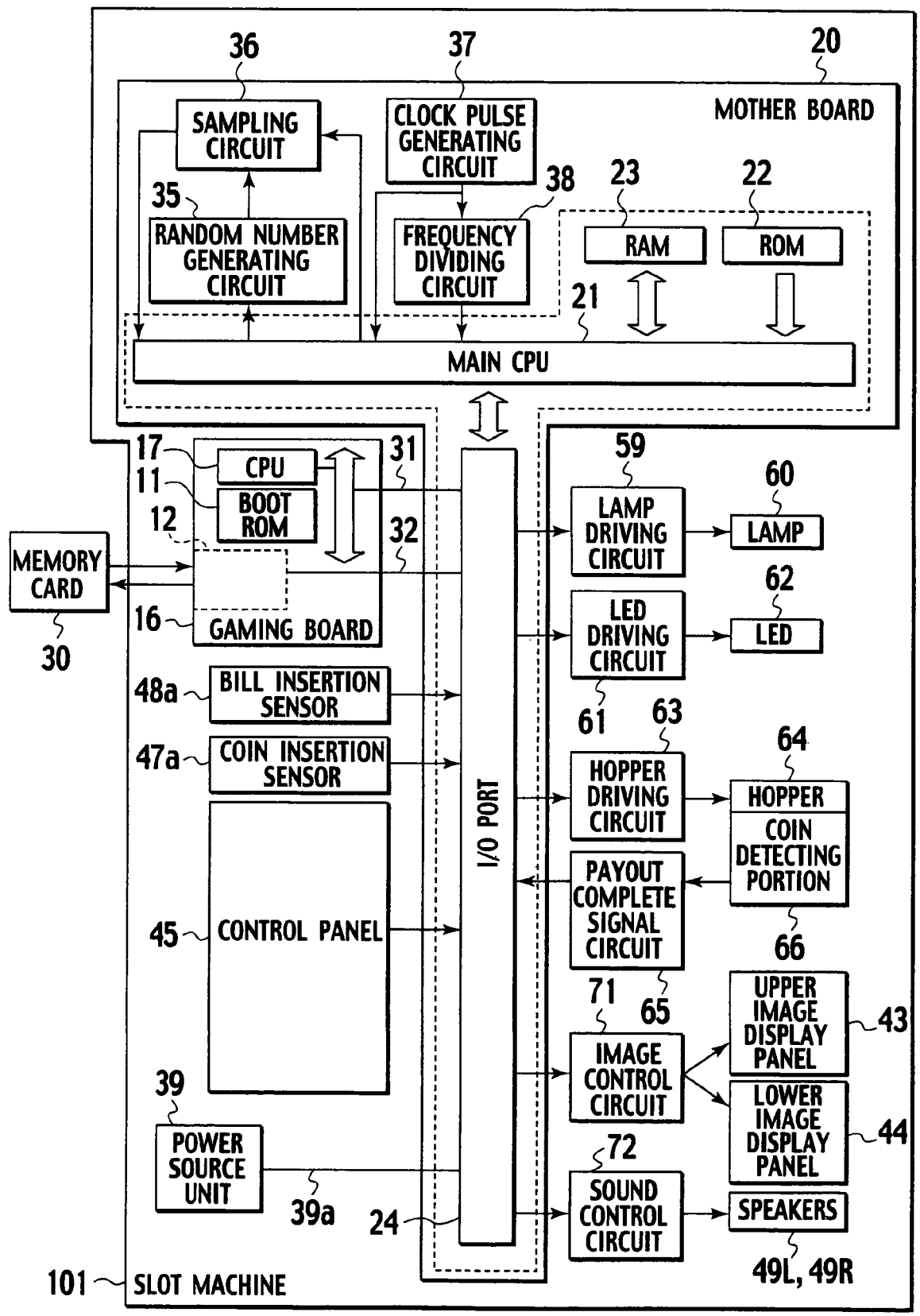
FIG. 10 is a block diagram of a slot machine according to the third exemplary embodiment of the present invention.

As shown in FIG. 10, a slot machine 101 is different from the slot machine 41 regarding the following matter: the gaming information authentication loading device 3 instead of the gaming information authentication loading device 1 is incorporated into the slot machine.

Figure 11:
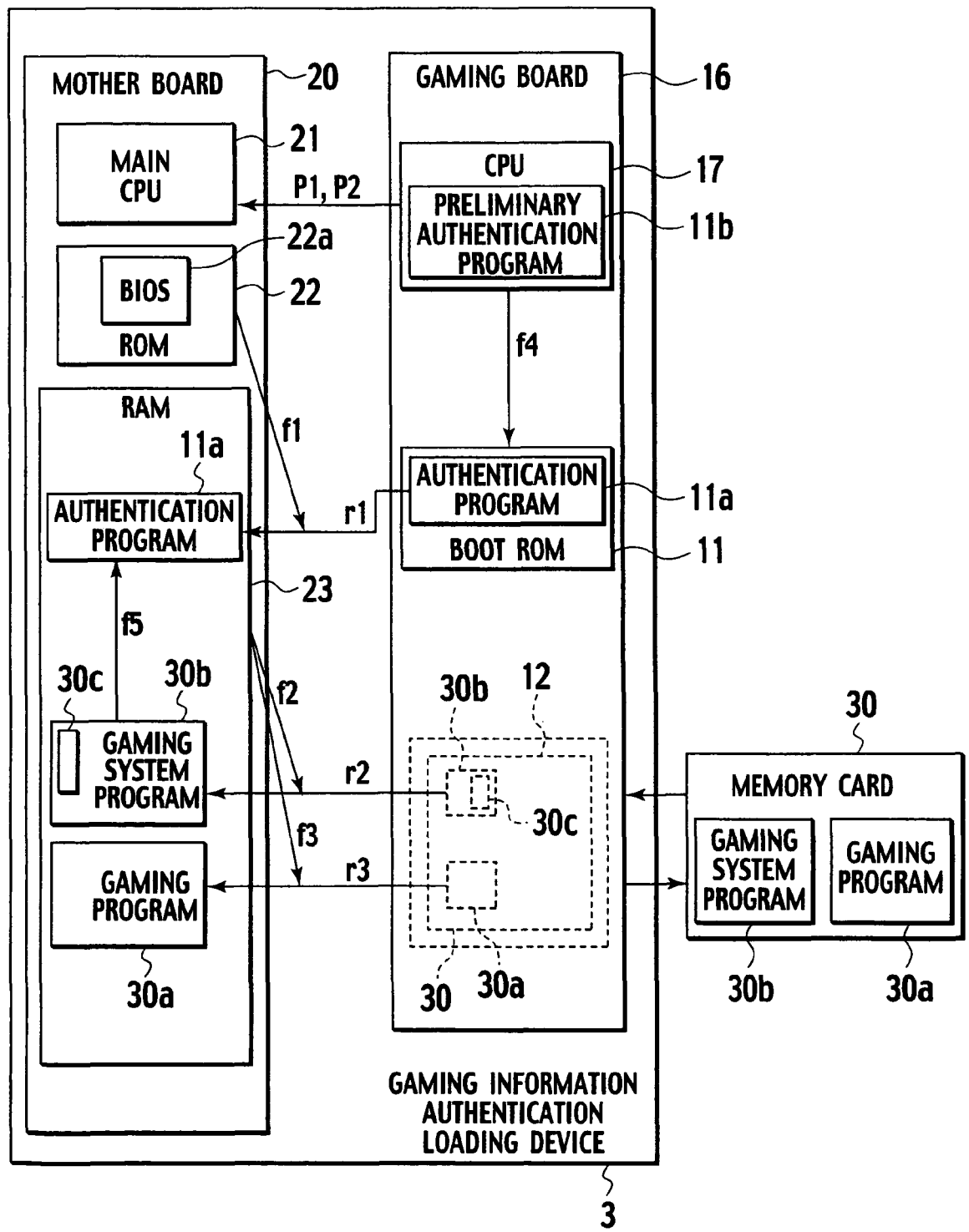
FIG. 11 is is a block diagram which shows a gaming information authentication loading procedure in the gaming information authentication loading device according to the third exemplary embodiment of the present invention.

As shown in FIG. 11, the gaming system program 30b stored in the memory card 30 includes a mutual authentication program 30c for executing an authentication process (mutual authentication process) f5 for the authentication program 11a. It is noted that the mutual authentication program 30c may be independent from the gaming system program 30b. A ROM (not shown) incorporated into the CPU 17 includes a preliminary authentication program 11b for executing an authentication process (preliminary authentication process) f4 for the authentication program 11a. It is noted that the preliminary authentication program 11b may be stored in the boot ROM 11.

Figure 12:
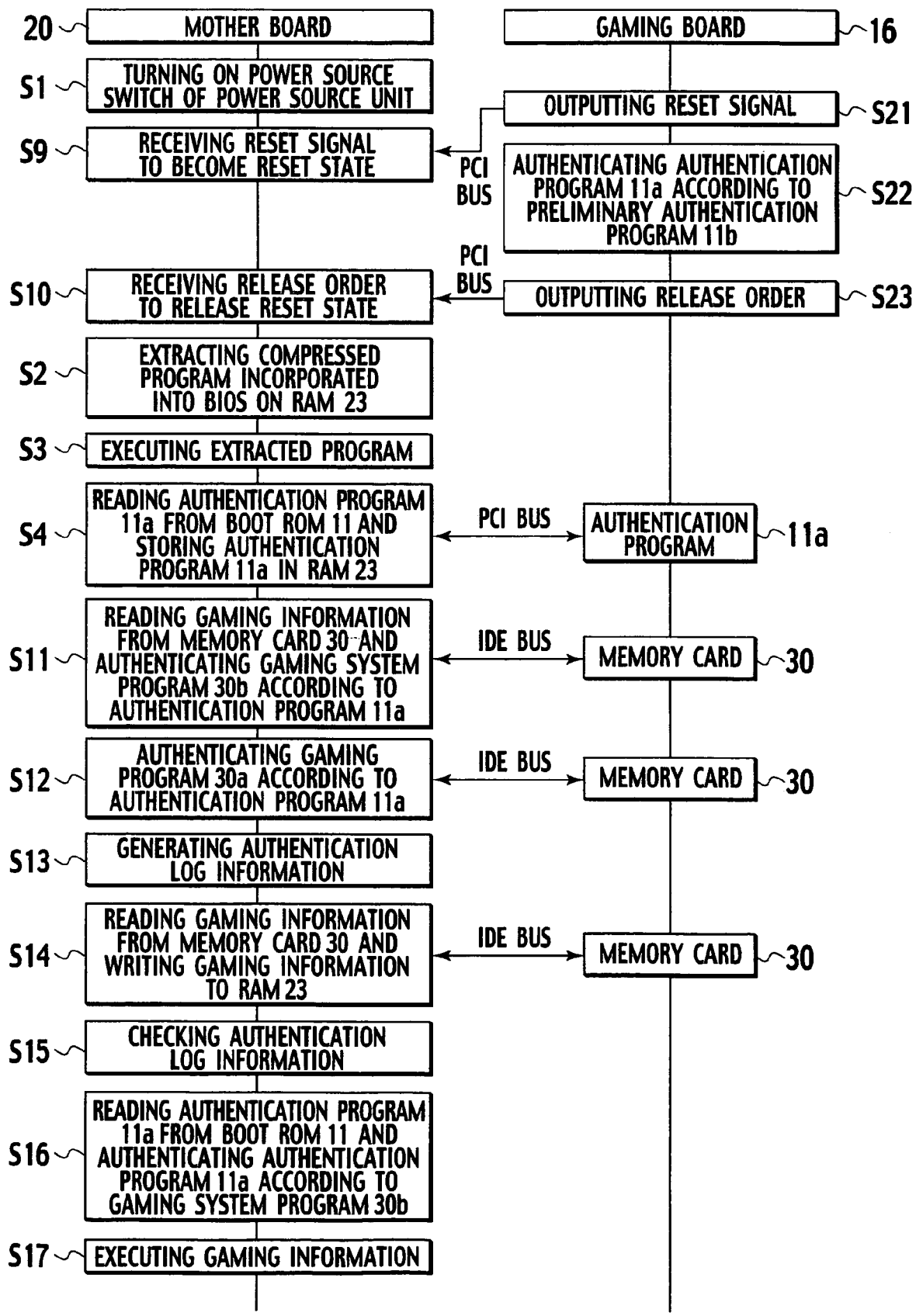
FIG. 12 is a chart which shows a gaming information authentication loading procedure executed between a mother board and a gaming board in the gaming information authentication loading device according to the third exemplary embodiment of the present invention.

As shown in FIG. 12, a gaming information authentication loading procedure is different from the gaming information authentication loading procedure of the first examplary embodiment regarding the following matter: the gaming information authentication loading device 3 executes steps S9, S10 between the step S1 and the step S2; the gaming information authentication loading device 3 executes steps S11 to S17 instead of the steps S5 to S7; and the CPU 17 of the gaming board 16 executes steps 21 to 23.

The gaming information authentication loading procedure will be described with reference to FIGS. 11 and 12.

In the step S1, the power source switch of the power source unit 39 is turned on. Processes on the gaming board 16 side are started when the power source switch has been turned on. In step S21, the CPU 17 executes an output process P1 to output a reset control (reset signal) to the main CPU 21 via the PCI bus 31. The reset control causes the main CPU 21 to hold a reset state without carrying out any process until the CPU 17 executes an output process P2 to output a release order to the main CPU 21. In step S22, the CPU 17 reads the preliminary authentication program 11b stored in the ROM and then operates as a preliminary authentication means to execute the authentication process f4 for checking that the authentication program 11a is not falsified and then authenticating it according to the read preliminary authentication program 11b. In step S23, after the authentication process f4 has normally finished, the CPU 17 executes the output process P2 to output the release order to the main CPU 21, which releases the reset state of the main CPU 21.

On the other hand, in step S9, the main CPU 21 receives the reset control to become the reset state where the main CPU 21 stops any process. In step S10, the main CPU 21 receives the release order to release the reset state thereof. In the steps S2 to S4, the main CPU 21 operates as the reading means to read from the boot ROM 11 the authentication program 11a authenticated in the authentication process f4, and then causes the read authentication program 11a to be temporarily stored in the RAM 23.

The steps S9, S10 on the mother board 20 side and the steps S21 to S23 on the gaming board 16 may be replaced by the following steps: (1) a prescribed storage such as register or memory for checking completion of the authentication process f4 is previously reserved on the gaming board 16 or the mother board 20; (2) the CPU 17 rewrites contents of the prescribed storage by holding up an ending flag when the authentication process f4 finishes; (3) the main CPU 21 detects the completion of the authentication process f4 by monitoring the rewritten contents of the prescribed storage; and (4) the main CPU 21 reads the authentication program 11a after detecting the completion of the authentication process f4. This can prevent the main CPU 21 from reading the authentication program 11a before the authentication process f4 finishes. At this time, this can prevents occurrence of a signal collision due to the CPU 17 and the main CPU 21 accessing simultaneously the PCI bus 31, without using another means such as a bus switching means.

In step S11, the main CPU 21 operates as the reading means to read the gaming program 30a and the gaming system program 30b from the memory card 30, as well as the step S5. Next, the main CPU 21 operates as the authentication means to execute the authentication process f2 for the read gaming system program 30b according to the stored authentication program 11a. In step S12, the main CPU 21 operates as the authentication means to execute the authentication process f3 for the read gaming program 30a according to the stored authentication program 11a, when the authentication process f2 has normally finished.

In step S13, the main CPU 21 operates as an authentication log information generating means to execute an authentication logging process for generating authentication log information which shows that the gaming program 30a and the gaming system program 30b are authenticated and then causing the generated authentication log information to be stored in the RAM 23, when the authentication process f3 has normally finished. In step S14, the main CPU 21 operates as the writing means to execute the loading process r2 for the authenticated gaming system program 30b and the loading process r3 for the authenticated gaming program 30a to write them to the RAM 23.

In step S15, the main CPU 21 accesses an address of the RAM 23 storing the authentication log information therein, and then checks that the authentication processes f2 and f3 have normally finished with reference to the authentication log information. In step S16, the main CPU 21 operates as the mutual authentication means to read the authentication program 11a from the boot ROM 11 to the RAM 23, and then execute the authentication process f5 for the authentication program 11a to check ex post facto that the authentication program 11a is a legitimate program according to the mutual authentication program 30c included in the gaming system program 30b written to the RAM 23, when having checked that the authentication processes f2 and f3 normally finished. The authentication process f5 is called the mutual authentication process because the authentication program 11a is authenticated according to the authenticated gaming system program 30b including the mutual authentication program 30c therein.

In step S17, the main CPU 21 operates as the action controlling means to check whether or not the authentication process f5 has normally finished, and then control a game proceeding (game action) according to the written gaming program 30a and the written gaming system program 30b when the authentication process f5 has normally finished.

Next, advantageous features of the gaming information authentication loading procedure will be described.

The gaming information such as the gaming program 30a and the gaming system program 30b can be easily loaded from the memory card 30 to the RAM 23 of the mother board 20 when the memory card 30 storing the gaming information therein is only inserted into the card slot 12 of the gaming board 16.

The authentication program 11a described along the authentication procedure is stored in the boot ROM 11 of the gaming board 16. Therefore, the authentication procedure can be executed according to the authentication program 11a to check whether or not the gaming information is not falsified and then authenticate it when the gaming information is loaded. As a result, in the gaming information authentication loading device 3, even if the gaming information is supplied from an outside device of the slot machine 101, the authenticated gaming information that is not falsified can be loaded, which certinaly prevents a malicious third party from making a falsification for the gaming information.

The preliminary authentication process f4 is carried out to check that the authentication program 11a is not falsified and then authenticate it before the authentication program 11a is stored in the RAM 23. Therefore, reliability for the authentication program 11a increases because the checkum and the preliminary authentication process f4 are carried out with respect to the authentication program 11a so as to authenticate that the authentication program 11a is not falsified and is a legitimate program. It is noted that the preliminary authentication program 11b is not rewritten because it is stored in the ROM in corporated into the CPU 17. It is further noted that the ROM may be the boot ROM 11.

The mutual authentication process f5 is carried out to check that the authentication program 11a is a legitimate program according to the mutual authentication program 30c included in the gaming system program 30b. Therefore, the authentication processes are carried out bi-directionally between the gaming information and the authentication program 11a. As a result, the gaming information and the authentication program 11a are consistent each other, which increases reliability for them.

It is considered that the authentication program 11a, the gaming program 30a and the gaming system program 30b are falsified after being stored in the RAM 23. However, the mutual authentication process f5 is carried out after the authentication log information which shows that the gaming program 30a and the gaming system program 30b are authenticated is stored in the RAM 23. Therefore, even if the gaming information is supplied from an outside device of the slot machine 101 and stored in the RAM 23, the stored gaming information can be not falsified because the mutual authentication process f5 is carried out after the gaming information is stored in the RAM 23, which more certinaly prevents a malicious third party from making a falsification for the gaming information.

Modified Third Exemplary Embodiment

Figure 13:
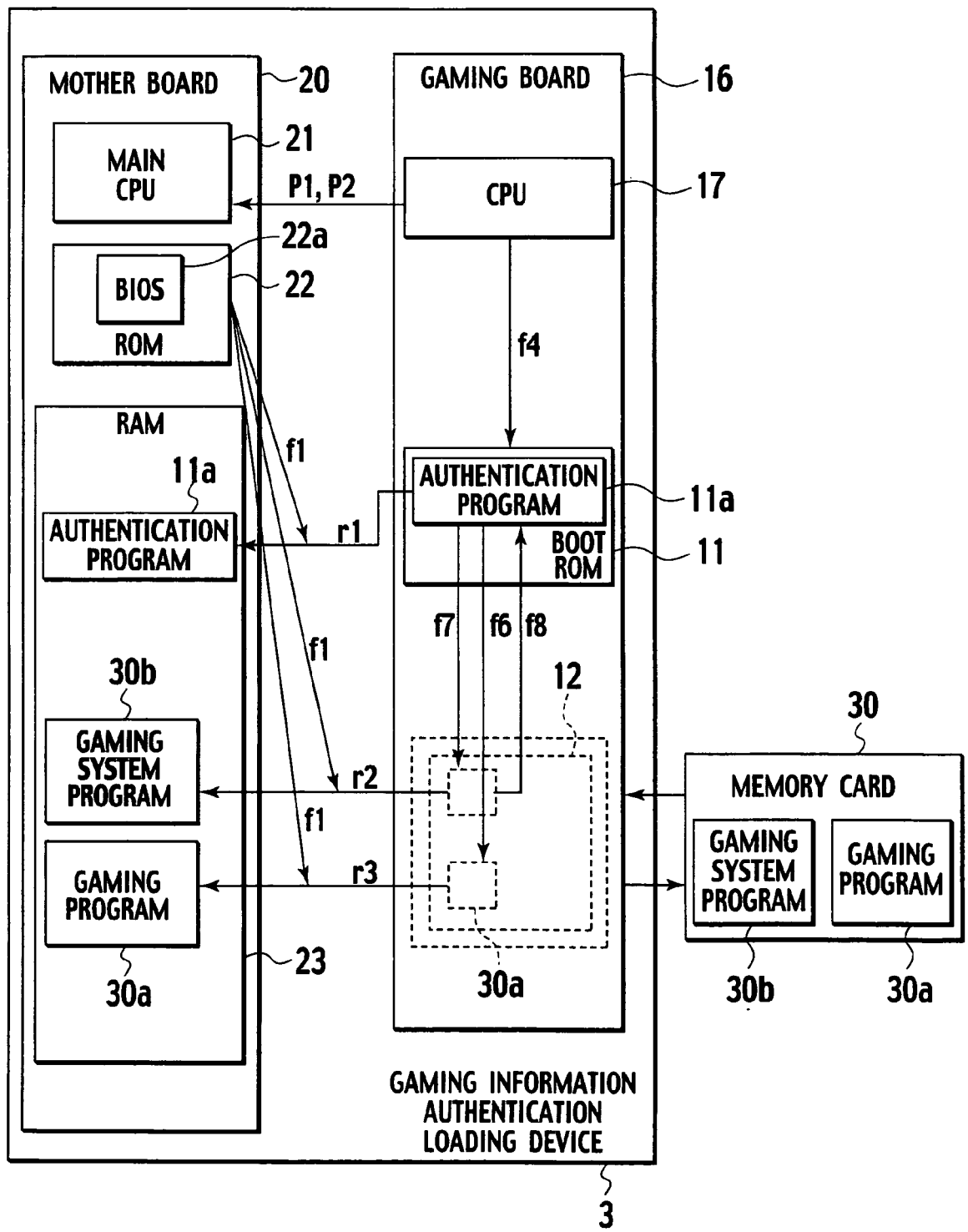
FIG. 13 is a block diagram which shows a gaming information authentication loading procedure in a gaming information authentication loading device according to the modified third exemplary embodiment of the present invention.

The gaming information authentication loading device 3 and the slot machine 101 may carries out a gaming information authentication loading procedure shown in FIG. 13.

In the third exemplary embodiment, the main CPU 21 of the mother board 20 carries out the authentication process f2 for the gaming system program 30b and the authentication process f3 for the gaming program 30a according to the authentication program 11a stored in the RAM 23, and then carries out the authentication process (mutual authentication process) f5 for the authentication program 11a according to the gaming system program 30b. On the other hand, in the modified third exemplary embodiment, the CPU 17 of the gaming board 10 carries out an authentication process f6 for the gaming program 30a and an authentication process f7 for the gaming system program 30b according to the authentication program 11a stored in the boot ROM 11, and then carries out an authentication process (mutual authentication process) f8 for the authentication program 11a according to the gaming system program 30b.

In the modified embodiment, the CPU 17 operates as the reading means, the authentication means and the mutual authentication means. The CPU 17 carries out the output process P2 to output the release order to the main CPU 21 after the authentication process f8 has been carried out, and then carries out the loading process r1 for the authentication program 11a, the loading process r2 for the gaming system program 30b and the loading process r3 for the gaming program 30a. In the loading processes r1, r2, r3, the main CPU 21 causes the read authentication program 11a, the read gaming program 30a and the read gaming system program 30b to be temporarily stored in the RAM 23, while carrying out the checksum in the ADDSUM type according to the standard BIOS function of the BIOS 22a to check whether or not the read authentication program 11a, the read gaming program 30a and the read gaming system program 30b are correctly stored in the RAM 23 (see the authentication processes f1 in FIG. 13).

The authentication processes are carried out bi-directionally between the gaming information and the authentication program 11a. Therefore, the gaming information and the authentication program 11a are consistent each other, which increases reliability for them.

Other Modified Exemplary Embodiments

The mutual authentication process may be carried out by the gaming information authentication loading device 2 and the slot machine 91 in the second exemplary embodiment. In this case, the steps S13 to S17 are carried out instead of the steps S6, S7, following the step S8 as shown in FIG. 8.

Although the slot machine configured to allow a player to play the slot game is cited as the gaming machine in the first to third exemplary embodiments, the slot machine may be replaced by another gaming machine such as a card gaming machine configured to allow a player to play a card game by using card images, a mah-jongg gaming machine configured to allow a player to play a mah-jongg game, or a pachinko gaming machine configured to allow a player to play a pachinko game by using a gaming boll. Further, in the slot machine, the quasi-reels may be replaced by mechanical reels. When the mechanical reels are employed in the slot machine.

Although the gaming information is composed of the gaming program 30a and the gaming system program 30b, the gaming information may be composed of one program or three or more programs.

In a case where the abnormality in each authentication process occurs, the main CPU 21 may stop the gaming information authentication loading procedure while notifying a game arcade staffs of the abnormality by using the speakers 49 R, 49L and/or the lamp 60.

It is also noted that, besides those already mentioned above, many modifications and variations of the above exemplary embodiments may be made without departing from the novel and advantageous features of the present invention. Accordingly, all such modifications and variations are intended to be included within the scope of the appended claims.

What is claimed is:

1. A gaming machine comprising:
a game action executing device configured to execute a game action;
a loading device including a connection unit configured to be connected to a removable storage medium storing therein gaming information including a mutual authentication program; and
a process device including a readable and rewritable storage unit,
wherein each of a program storage unit, a reading unit, an authentication unit and a mutual authentication unit is included in at least one of the loading device and the process device:
the program storage unit configured to store therein an authentication program for authenticating the gaming information stored in the storage medium;
the reading unit configured to read the authentication program from the program storage unit and the gaming information from the storage medium connected to the connection unit;
the authentication unit configured to execute an authentication process for the read gaming information according to the read authentication program; and
the mutual authentication unit configured to execute a mutual authentication process for the authentication program to check that the authentication program is a legitimate program according to the mutual authentication program included in the gaming information authenticated by the authentication unit,
the process device includes a writing unit configured to write the gaming information authenticated by the authentication unit to the readable and rewritable storage unit, and
the process device includes an action controlling unit configured to control the game action executing device according to the written gaming information so that the game action executing device executes the game action, when the mutual authentication unit has executed the mutual authentication process.

2. The gaming machine according to claim 1, wherein an authentication log information generating unit is included in at least one of the loading device and the process device, the authentication log information generating unit configured to generate authentication log information regarding the authentication process for the read gaming information.

3. The gaming machine according to claim 2, wherein a preliminary authentication unit is included in at least one of the loading device and the process device, the preliminary authentication unit configured to execute a preliminary authentication process for the authentication program before the reading unit reads the authentication program from the program storage unit.

4. The gaming machine according to claim 1, wherein a preliminary authentication unit is included in at least one of the loading device and the process device, the preliminary authentication unit configured to execute a preliminary authentication process for the authentication program before the reading unit reads the authentication program from the program storage unit.

5. A gaming information authentication loading device comprising:
a loading device including therein a connection unit configured to be connected to a removable storage medium storing therein gaming information including a mutual authentication program; and
a process device including a readable and rewritable storage unit,
wherein each of a program storage unit, a reading unit, an authentication unit and a mutual authentication unit is included in at least one of the loading device and the process device:
the program storage unit configured to store therein an authentication program for authenticating the gaming information;
the reading unit configured to read the authentication program from the program storage unit and the gaming information from the storage medium connected to the connection unit;
the authentication unit configured to execute an authentication process for the read gaming information according to the read authentication program; and
the mutual authentication unit configured to execute a mutual authentication process for the authentication program to check that the authentication program is a legitimate program according to a mutual authentication program included in the gaming information authenticated by the authentication unit, and
the process device includes a writing unit configured to write the gaming information authenticated by the authentication unit to the readable and rewritable storage unit.

6. The gaming information authentication loading device according to claim 5, wherein an authentication log information generating unit is included in at least one of the loading device and the process device, the authentication log information generating unit configured to generate authentication log information regarding the authentication process for the read gaming information.

7. The gaming information authentication loading device according to claim 6, wherein a preliminary authentication unit is included in at least one of the loading device and the process device, the preliminary authentication unit configured to execute a preliminary authentication process for the authentication program before the reading unit reads the authentication program from the program storage unit.

8. The gaming information authentication loading device according to claim 5, wherein a preliminary authentication unit is included in at least one of the loading device and the process device, the preliminary authentication unit configured to execute a preliminary authentication process for the authentication program before the reading unit reads the authentication program from the program storage unit.

9. A gaming information loading device configured to load gaming information including a mutual authentication program stored in a removable storage medium from the storage medium to a mother board connected to the gaming information loading device, comprising:
a connection unit configured to be connected to the storage medium;
a program storage unit configured to store therein an authentication program for authenticating the gaming information;
a reading unit configured to read the authentication program from the program storage unit and the gaming information from the storage medium connected to the connection unit;
an authentication unit configured to execute an authentication process for the read gaming information according to the read authentication program; and
a mutual authentication unit configured to execute a mutual authentication process for the authentication program to check that the authentication program is a legitimate program according to a mutual authentication program included in the gaming information authenticated by the authentication unit.

10. The gaming information loading device according to claim 9, further comprising a preliminary authentication unit configured to execute a preliminary authentication process for the authentication program before the reading unit reads the authentication program from the program storage unit.

* * * * *